March 28, 1939.  S. CLAUSEN  2,151,898

KNURLER UNIT FOR CIGAR MACHINES

Filed Sept. 19, 1936

INVENTOR
Sigurd Clausen
BY George S. Hastings
ATTORNEY

Patented Mar. 28, 1939

2,151,898

UNITED STATES PATENT OFFICE 2,151,898

KNURLER UNIT FOR CIGAR MACHINES

Sigurd Clausen, Brooklyn, N. Y., assignor to International Cigar Machinery Company, a corporation of New Jersey Application September 19, 1936, Serial No. 101,563

1 Claim. (Cl. 131—39)

This invention relates to knurlers for cigar machines, such as are used for hand-knurling the finished cigars before tying them up in bundles, or otherwise stacking them for boxing or packaging. Its main object is to provide a completely housed oil-tight unit without any exposed oil-throwing parts, which can be adjusted to any convenient angular position. A further object is to adjustably mount on the knurler unit the bundle tray for stacking the finished cigars, so that the tray will remain in the same adjusted position relative to the cigar rest of the knurler at all positions of the latter. With these and other objects not specifically mentioned in view, the invention consists in certain constructions and combinations hereinafter fully described and claimed.

Figure 1:
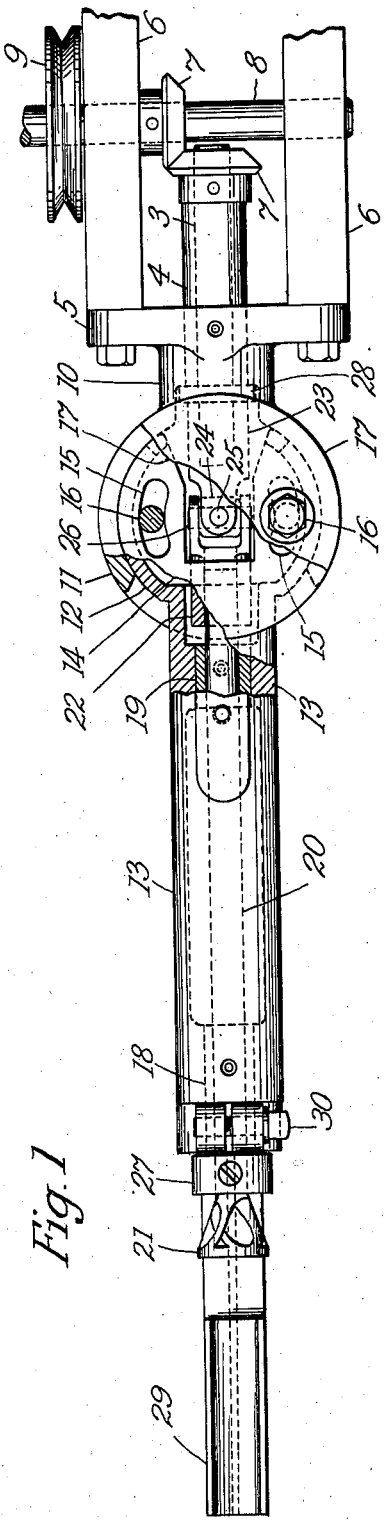
Figure 2:
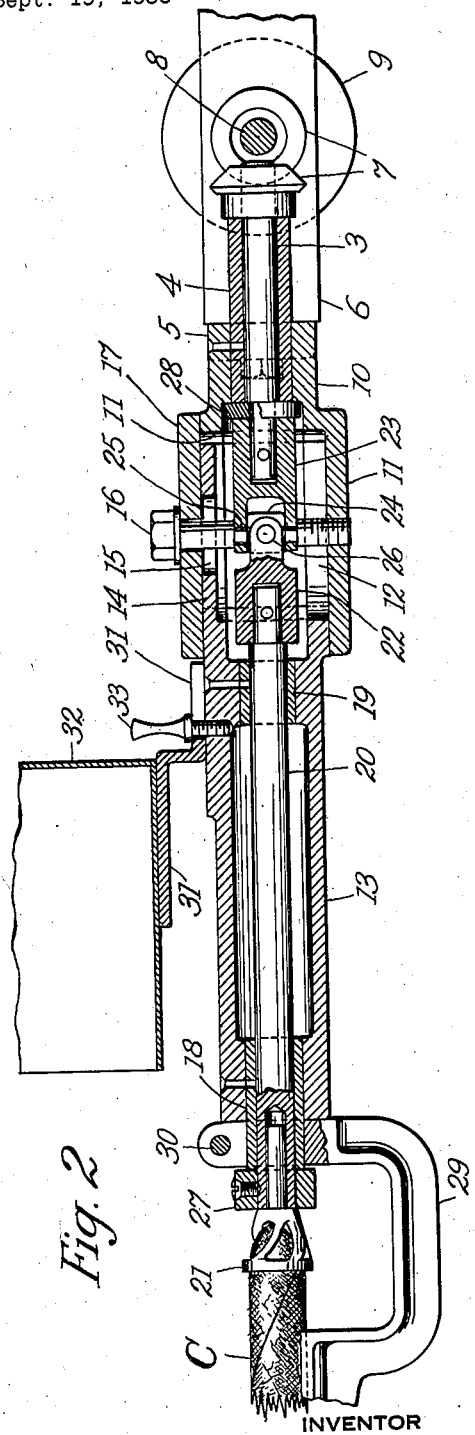

In the accompanying drawing which forms a part of this specification and in which like characters of reference indicate the same or like parts:

Fig. 1 is a plan view of an adjustable hand knurler embodying the invention; and Fig. 2 is a sectional side elevation of the same.

Referring to the drawing, a horizontal shaft 3 supported by a bushing 4 held in a bracket 5 attached to the frame 6 of the cigar machine, is driven through bevel gears 7 from a shaft 8 carrying a pulley 9 mounted thereon, to which motion is imparted from the cigar machine drive.

The boss 10 of bracket 5 has formed thereon a cylindrical flange 11 in which is pivotally mounted the arcuate head 12 of a tubular holder 13. The flange 11 is open at the end towards holder 13 and closed at the bottom, and the head 12 is open adjacent the hub of the bracket 5 and has a wall 14 at its top. The wall 14 of cylinder 12 is provided with concentric slots 15 for the passage of bolts 16 which hold the cover 17 of housing 11 in place, thereby making the housing oil-tight. Upon loosening these bolts, the holder 13 may be turned to either side within the limits of the slots 15 and of the end opening of housing 11.

In bushings 18 and 19 the holder 13 supports a spindle 20 which is provided with a socket at its outer end into which is fitted the shank of the knurler head 21, and its other end may be connected to shaft 3 by a universal joint of conventional construction consisting of yokes 22 and 23 provided with sockets in which the shaft 3 and spindle 20 are fixed and a block 24 provided with pins 25 and 26 intersecting at right angles and pivoted in the tines of the yokes 22 and 23 respectively. The pin 25 is disposed vertically and the slots 15 are concentric therewith. Axial movement of spindle 20 is prevented by a collar 27 fastened on the spindle in abutting relation with the bushing 18 of holder 13 and serving to hold the yoke 23 against a collar 28 bearing on an internal shoulder of shaft 3. The bushing 18 protrudes beyond the end of holder 13 and carries a rest piece 29 for guiding the cigar C being knurled, the said rest piece being clamped to bushing 18 by means of a bolt 30. The space within the knuckle-joint formed by the articulated connection of the flange 11 and head 12 may be packed with grease to lubricate the universal joint, and sealed by tightening up the bolts 16 on the cap 17.

On holder 13 is mounted a bracket 31 carrying the bundle tray 32 in which the finished cigars are stacked. The bracket 31 is provided with a longitudinal slot through which passes a thumb-screw 31 threaded into the holder 13 so that it can be adjusted to the most convenient position to suit the operator. The tray 32 then retains its relative position to the cigar C in the knurler for any angular adjustment of the holder 13.

What is claimed is:

A knurler mechanism of the class described comprising a support enclosing a driving shaft member, and a driven shaft member articulated therewith and enclosed by a holder joined to said support by a lubricant-tight casing; said casing being constituted by a fixed part mounted on said support and a movable part adjustable exclusively in a horizontal plane around a vertical axis coinciding with the mean vertical axis of articulation of the driving and driven members of the shaft, a knurler device carried by and actuated by the free end of said driven shaft member, said casing parts being fabricated with interfitting webs provided with several orifices, the inner web having arcuate slots concentric with said vertical axis of articulation and displaced radially therefrom, said arcuate slots being covered generally by a web or an exterior part, the latter having bolt holes disposed in vertical alignment, and bolts tapped into said holes and each extending through one of said inner web slots and having a head protruding beyond the other web hole, whereby an adjustable lubricant-tight bolt fastening means is provided in non-interfering relation with the articulation structure of the casing, and that within the casing.

SIGURD CLAUSEN.